(12) United States Patent
LaRue (10) Patent No.: US 6,509,715 B1
(45) Date of Patent: Jan. 21, 2003

(54) RECHARGEABLE BATTERY SYSTEM FOR HAND-HELD DEVICES

(75) Inventor: Douglas J. LaRue, San Diego, CA (US)

(73) Assignee: D.J. LaRue Enterprises, Inc., San Diego, CA (US)

( * ) Notice: Subject to any disclaimer, the term of this patent is extended or adjusted under 35 U.S.C. 154(b) by 0 days.

(21) Appl. No.: 10/139,450

(22) Filed: May 6, 2002

Related U.S. Application Data (60) Provisional application No. 60/289,451, filed on May 7, 2001.

(51) Int. Cl.[7] .................................................. H02J 7/00
(52) U.S. Cl. ...................................... 320/107; 320/114
(58) Field of Search ................................. 320/107, 114; 429/34, 37, 96, 100

(56) References Cited

U.S. PATENT DOCUMENTS 6,041,243 A * 3/2000 Davidson et al. ........... 455/575

* cited by examiner

Primary Examiner—Edward H. Tso
Assistant Examiner—Lawrence Luk
(74) Attorney, Agent, or Firm—Gordon E. Nelson (57) ABSTRACT

A battery-charging adapter for a hand-held personal digital assistant (PDA) of the type that is placed in a data cradle. The adapter includes a battery pack that replaces the batteries in the PDA and has a recharging interface, a door that replaces the door of the PDA's battery compartment and permits access to the battery pack's recharging interface when the door is closed, and a surface which is attachable to the data cradle and has a recharging interface and recharging circuitry which is coupled to the recharging interface and a power supply. When the adapter surface is attached to the data cradle and the PDA is in the cradle, the battery pack's recharging interface is coupled to the adapter's recharging interface, permitting the batteries in the PDA to be recharged while the PDA is in the cradle.

2 Claims, 7 Drawing Sheets

| ITEM | QTY. | MAN PART# | MANUFACTURER | VALUE | DESCRIPTION | REF. DES. |
|---|---|---|---|---|---|---|
| MAIN CIRCUIT | | | | | | |
| 1 | 2 | CUSTOM | CUSTOM | CUSTOM | CUSTOM CONTACT SPRINGS | P1 P2 |
| 2 | 1 | LNJ21 1R8ARU | PANASONIC | HIGH RED | LED SMD | D3 |
| 3 | 1 | BSS138 | FAIRCHILD | | TRANSISTOR, MOSFET, N-CHAN 50V | Q1 |
| 4 | 1 | ZXM61P02FTA | ZETEX | 20VDS0.8A | TRANSISTOR, MOSFET, P-CHAN | Q2 |
| 5 | 1 | PIC120672-04/SM | MICROCHIP | | IC, MICROCONTROLLER W/AD CONVERTERS 2K | U1 |
| 6 | 2 | | XICON | 20.0K | CHIP RESISTOR, 5% 1/16W | R4 R16 |
| 7 | 1 | | XICON | 620 | CHIP RESISTOR, 5% 1/16W | R3 |
| 8 | 8 | | XICON | 62 | CHIP RESISTOR, 5% 1/8W | R5 R5 R7 R8 R5a R6a R7a R8a |
| 9 | 1 | | XICON | 1M | CHIP RESISTOR, 5% 1/16W | R14 |
| 10 | 3 | | XICON | 4.7K | CHIP RESISTOR, 5% 1/16W | R15 R17 R17a |
| +-1% REG | | | | | | |
| 30 | 1 | LM4040DIM3-5.0 | NATIONAL SEMI | | IC PRECISION SHUNT VOLTAGE REFERENCE, 5V 1% | D2 |
| 31 | 1 | 06032R104K7B20D | PHYCOMP USA | 0.1UF | CAP CERAMIC X7R 16V | C2 |
| 32 | 1 | | XICON | 270 | CHIP RESISTOR 5% 1/10W | R2 |
| 39 | 1 | | CUI STACK | | POWER SUPPLY, WALL CUBE, 6VDC@200 MA UNREG | W1 |
| BATTERY PACK | | | | | | |
| 100 | 2 | MH-650AAA | MAHA | 650MAH | RECHARGABLE NMh 650 MAH AAA BATTERY | B1 B2 |
| 101 | 21 | MC011 | COMPONENT CONCEPTS | | CONTACT BUTTONS | P3 P4 |
| 102 | 1 | DL4001 | DISCRETE SEMICONDUCTOR | | SILICON RECTIFIER | D4 |
| 103 | 1 | | XICON | 4.7K | CHIP RESISTOR 5% 1/16W | P9 |
| 104 | 2 | MS156-0.60-.05R | COMPONENT CONCEPTS | | SOLDER TABS | |

Fig. 10

RECHARGEABLE BATTERY SYSTEM FOR HAND-HELD DEVICES

CROSS-REFERENCES TO RELATED APPLICATION

The present patent application claims priority from U.S. Provisional Patent Application No. 60/289,451, Douglas J. LaRue, Rechargeable Battery System for Hand-Held Devices, filed Jun. 7, 1991.

BACKGROUND OF THE INVENTION

Hand-held data-connected devices such as Palm Computing's Palm Pilot and the HandSpring Visor series of personal digital assistants (PDA's) ship with connectivity devices, called Data Cradles, to allow for data transfer between the PDA and other data centers such as the Personal Computer (PC), the Corporate Server, or another PDA. The data transfers allow for data synchronization, backup, data uploading, and data downloading from or to the PDA and the data center(s). Many data cradles are limited only to data operations such as those listed above. This limits what the PDA can do and what can be done to the PDA while the PDA is in the data cradle. For instance, there are disadvantages, when PDA's use disposable power systems such as alkaline batteries. The disadvantages include, losing data, making incomplete data connections, and the user being inconvenienced by the need to replace the batteries when the power systems become depleted.

There are many advantages in having a cost effective way to adapt hand-held devices and their data cradle connectivity system when the added features can be used without interfering with data cradle usage. To be effective, the adaptation must be convenient to use, add needed features, and must maintain consistent data connectivity. For example, it would be an advantage if the PDA used a rechargeable power system, that was recharged while the PDA was in the data cradle, and recharging did not interfere with data connectivity. It is thus an object of the invention to provide such a cost-effective way to adapt hand-held devices and their cradles to add new features.

SUMMARY OF THE INVENTION

The foregoing object is attained by means of an adapter that adds a function to a cradle for a hand-held device. The adapter includes an adapter surface that is attached to the device and is located between a surface of the cradle and a surface of the hand-held device when the adapter surface is attached to the cradle and the hand-held device is in the cradle. The surface of the hand-held device has a first interface for the function. The adapter further includes a second interface for the function that is located in the adapter surface such that when the adapter surface is attached to the cradle and the hand-held device is in the cradle, the second interface interacts with the first interface as required for the function.

In another aspect, the problems of recharging a battery-powered hand-held device that has a cradle are solved by means of a kit that makes it possible to recharge a battery-powered hand-held device that has a cradle by placing the hand-held device in its cradle. The batteries in the hand-held device are contained in a compartment that opens onto a surface of the hand-held device. The kit includes an adapter surface that is attachable to the cradle, the adapter surface being located between a surface of the cradle and the surface of the hand-held device when the adapter surface is attached to the cradle and the hand-held device is in the cradle. The adapter surface has a first interface for providing a recharging current to the hand-held device. The kit further includes a battery holder that is capable of replacing the batteries in the compartment. The battery holder includes a second interface for receiving the recharging current and the second interface is coupled to the first interface when the batteries have been replaced by the battery holder, the adapter surface has been attached to the cradle, and the hand-held device is in the cradle.

Other objects and advantages will be apparent to those skilled in the arts to which the invention pertains upon perusal of the following Detailed Description and drawing, wherein:

GENERAL PRINCIPLES OF THE INVENTION

The principles of the invention may be embodied in many different kinds of systems for adding and/or extending features to hand-held data-connected computing devices during data cradle docking. The main purpose is to augment hand-held devices, and their data cradles to provide additional features and/or extend current features to enhance the appeal and usefulness of the device.

The principles of the invention may be applied in at least four such areas of augmentation, including: 1) The augmentation of the mechanical interface to the hand-held device and/or the data cradle, to support among other things, additional electrical and/or electro-optical interfacing with the hand-held device. This allows new devices or electronic circuits to interface with the data cradle/PDA combination. Examples of such augmentations are, but are not restricted to, adding contacts for adding battery recharging capabilities, adding contacts for external high-end audio equipment such as a microphone headset or speakers, adding a Infra-Red receiver/transmitter so data could be "beamed" to the device without removal from the data cradle to gain access to the PDA's Infra-Red port, adding a temperature probe or thermocouple to measure the case temperature of the docked PDA. 2) The augmentation of the mechanical structure of the hand-held device and/or data cradle, to support additional Input/Output interfacing with the user. This allows the data cradle/PDA combination to interface with the user in new ways, providing the user with more or better information. Examples of such augmentations are, but are not restricted to, adding output such as a indicator LED (light emitting diode) for battery charge state, adding inputs such as RECORD and/or PLAY buttons to activate a external microphone or speaker, adding input such as a button which will deliver data to the Infra-Red port on the docked PDA, adding output such as a temperature readout to indicate the docked PDA's approximate temperature , adding output such as a timer or clock. 3) The augmentation of the mechanical housing to the hand-held device and/or the data cradle, to support additional electronic circuitry. This allows new features to be provided by added electronic circuitry, enhancing the capability of the data cradle/PDA combination. Examples of such augmentations are, but are not restricted to, adding electrical circuitry to support battery recharging, adding electrical circuitry to support amplification or filtering of audio data, adding electrical circuitry to support relaying Infra-Red signals to and from the docked PDA adding electrical circuitry to support reading and displaying of temperature, adding electrical circuitry to support a clock and it's display. 4) The augmentation of the electrical power systems of the hand-held device and/or data cradle, to support additional power supply capabilities. This allows more electrical power to be added to the data cradle/PDA combination, which is typically limited to battery power only. Examples of such augmentations are, but are not restricted to, adding electrical power to augmentation circuits such as the ones listed above, adding solar power to supply electrical energy to rechargeable batteries or to power augmentation circuits such as the ones listed above, adding electrical power to supply energy to components used in the docked PDA that have their own batteries and/or derive their power from the PDA, adding electrical power to keep the docked PDA operating at a controlled temperature.

DESCRIPTION OF AN EXEMPLARY EMBODIMENT

Figure 1A:
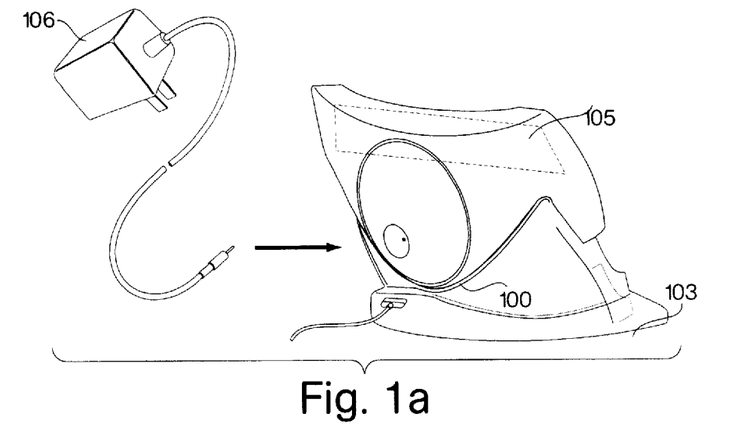
FIG. 1A is a drawing showing a rear view of a PDA's data cradle with a battery charger adapter mounted on the data cradle and of an external power source that may be connected to the battery charger adapter.
Figure 1B:
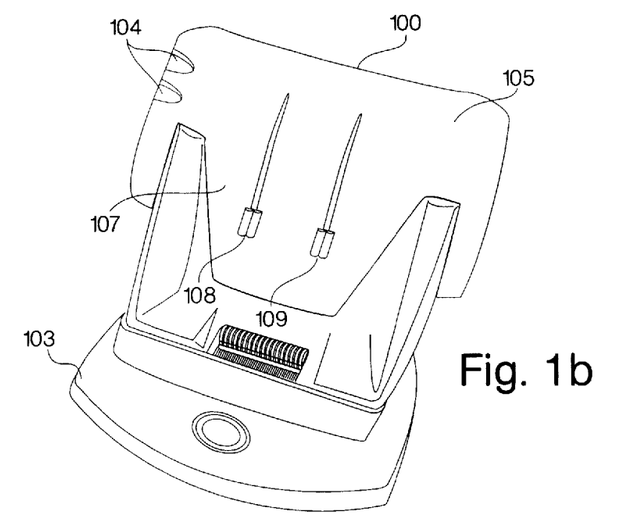
FIG. 1B is a drawing showing a front view of the data cradle with the battery charger adapter mounted on it.
Figure 1C:
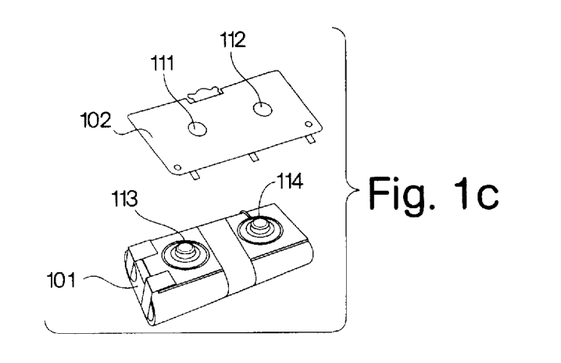
FIG. 1C is a drawing showing a replacement battery pack and battery pack cover that are installed in the PDA to make the PDA rechargeable via the battery charger adapter.
Figure 2A:
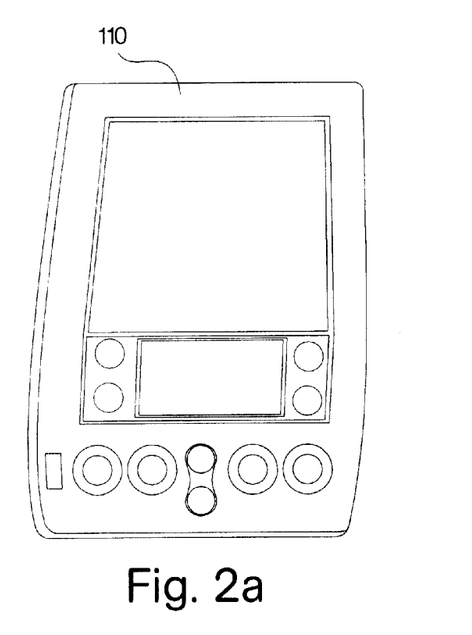
FIG. 2A is a drawing of a PDA showing both the front view in accordance with a preferred embodiment of the present invention.

The exemplary embodiment of the invention which will be described in the following is a rechargeable power system for devices where the power system requires the removal of a disposable power system when their resources have been depleted. Such devices can be retrofitted in such a way as to eliminate the need to remove and/or replace the power system each time it is depleted, to charge the rechargeable power system, and to maintain normal data transfer operations without interruptions or additional user operations. The preferred embodiment uses specific augmentations of the general embodiment. The exemplary embodiment provides a surface for the hand-held device to rest where it would normally rest on the data cradle (FIG. 1—107). The new surface for the hand-held device houses electrical contacts (FIG. 1—108,109/FIG. 9—P1,P2) to allow charging and capacity testing of a replacement battery pack (FIG. 1—101). The battery pack is placed in the hand-held device (FIG. 2A—110) and has exposed electrical contacts (FIG. 2B—111,112) for recharging. The electrical contacts on the surface (FIG. 1—108,109/FIG. 9—P1,P2) and on the battery pack (FIG. 1—113,114/FIG. 8—P4,P3) provide an augmented electrical interface with the PDA. The exemplary embodiment is thus a specific example of the principles of the invention. The exemplary embodiment further provides extended user output in the form of a battery charging state indicator (FIG. 1—104). This is an example of Input/Output augmentation. The exemplary embodiment also provides a housing for the electrical circuitry (FIG. 1—105) which provides the charging and testing capabilities (see also FIG. 9). This is a specific manifestation of the electronic circuitry augmentation in the general embodiment. Finally, the exemplary embodiment is connected to an external power source (FIG. 1—106) which provides the additional power required to run the electrical circuit and charge the replacement battery pack. This is a specific manifestation of power supply augmentation.

Figure 6:
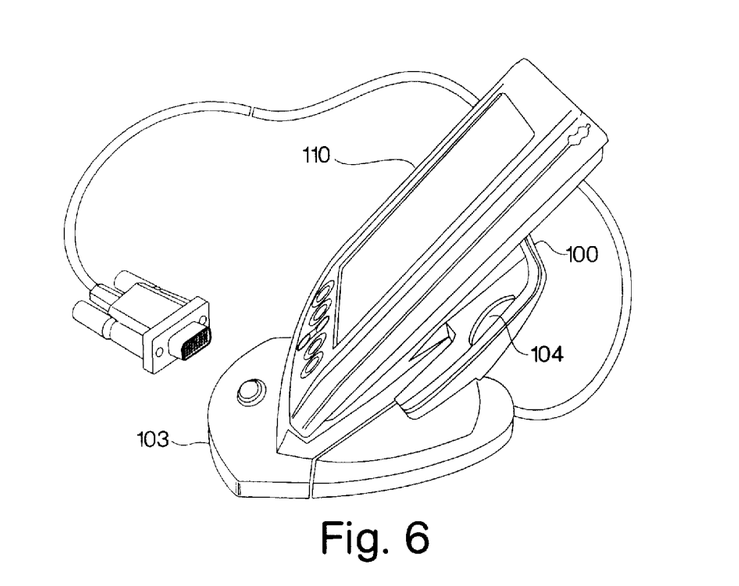
FIG. 6 is a drawing of the present invention installed on a Data Cradle with the PDA installed in accordance with a preferred embodiment of the present invention.

The augmentation adapter allows for adding/extending of features to the device and without affecting data connectivity simultaneously without replacing the existing data connectivity equipment or hand-held device (see FIG. 6).

Figure 2B:
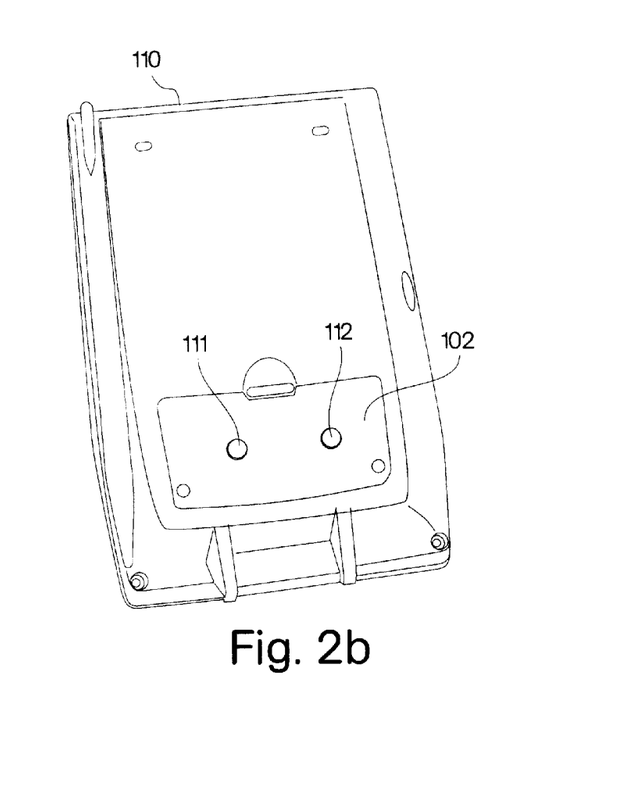
FIG. 2B is a drawing of a PDA showing the rear view of the device including details related to the exposing of the replacement power systems contact areas in accordance with a preferred embodiment of the present invention.
Figure 3:
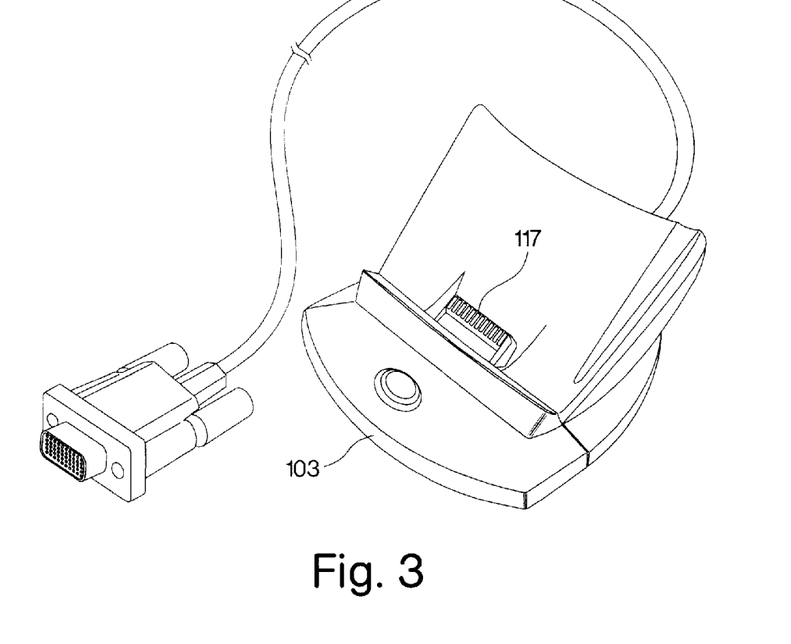
FIG. 3 is a drawing of a PDA's Data Cradle showing the data connectivity port.
Figure 4:
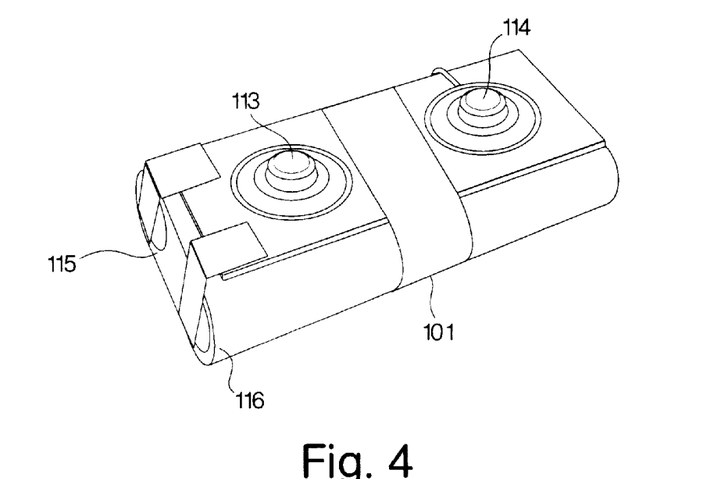
FIG. 4 is a drawing of a replacement power system in accordance with a preferred embodiment of the present invention.
Figure 5:
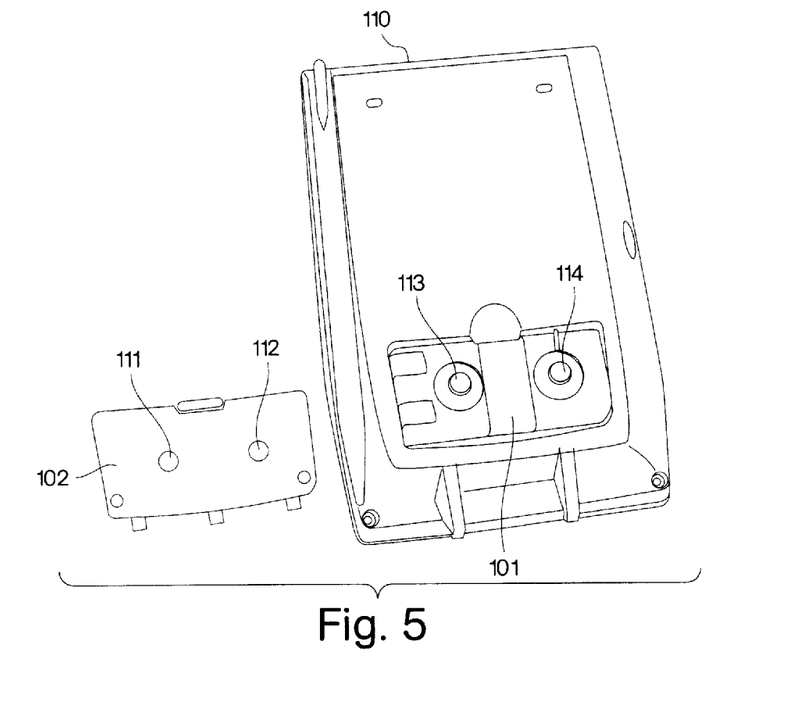
FIG. 5 is a drawing of a PDA showing the rear view of the device including details of an inserted replacement power system and the removed replacement battery compartment door in accordance with a preferred embodiment of the present invention.
Figure 7A:
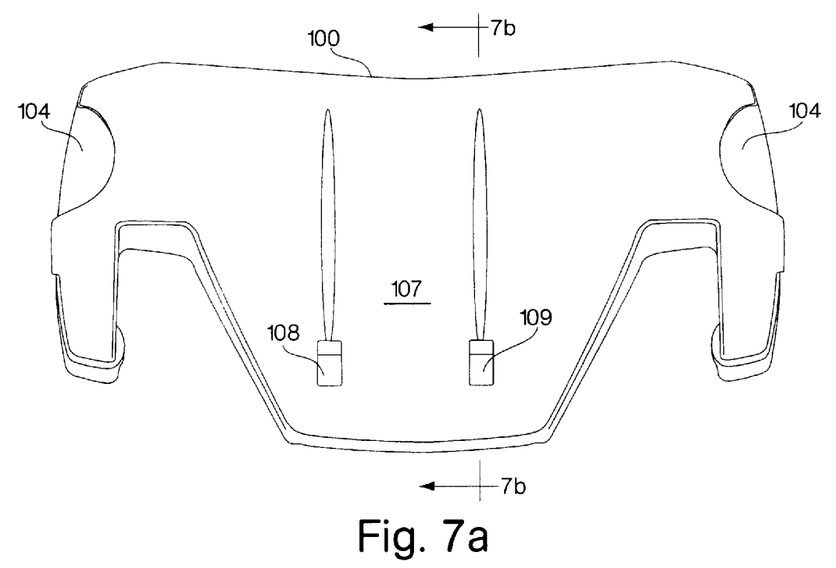
FIG. 7A is a drawing of a front view of the adapter element which interfaces with both the PDA and the data cradle in accordance with a preferred embodiment of the present invention.
Figure 7B:
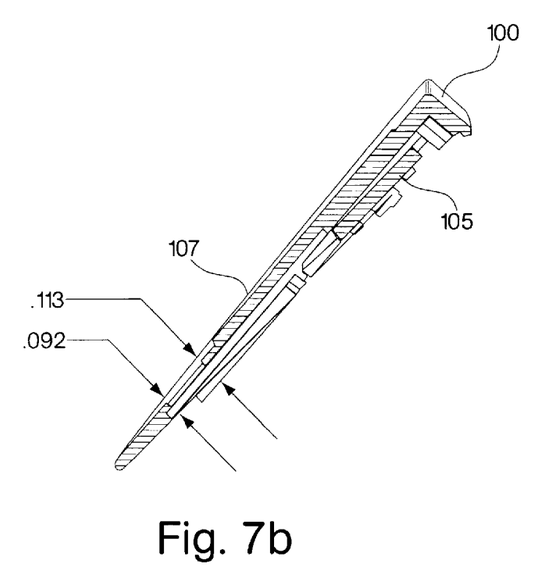
FIG. 7B is a drawing of a cross sectional view of the adapter element which interfaces with both the PDA and the data cradle in accordance with a preferred embodiment of the present invention.
Figure 8:
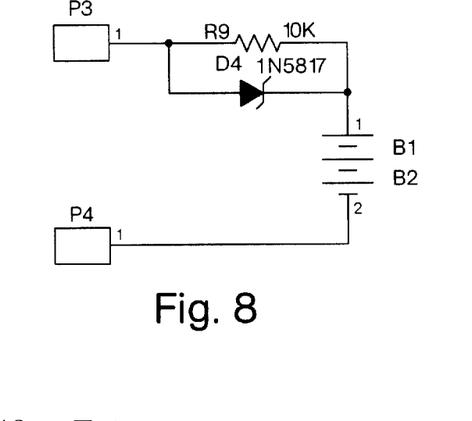
FIG. 8 illustrates SCH. 1, an electrical schematic of a rechargeable battery pack circuit in accordance with the preferred embodiment of the present invention.

FIG. 1 shows a drawing of a battery charger adapter (FIG. 1—100), a replacement battery pack (FIG. 1—101), and a replacement battery compartment door (FIG. 1—102) for use with a Personal Digital Assistant (PDA) (FIG. 2A—110) and it's data cradle (FIG. 1—103) in accordance with a preferred embodiment of the present invention. The battery charger adapter (FIG. 1—100) is affixed to the data cradle (FIG. 1—103) and using a thin structure (see FIG. 7B, Cross Sectional View) to allow the PDA (FIG. 2A—110) to connect with the data cradle's data port's (FIG. 1—117) electrical connections. Under normal operation, the battery charger adapter (FIG. 1—100) remains affixed to the data cradle (FIG. 1—103) and the PDA (FIG. 2A—110) is inserted and removed at will from the data cradle (FIG. 1—103) adapter combination. To facilitate charging, the replacement battery pack (FIG. 1—101) is provided with electrical contacts (FIG. 1—113,114/FIG. 8—P4,P3) that are exposed through an outside surface of the PDA via the replacement battery compartment door (FIG. 2B—111,112). The electrical contacts (FIG. 1—113,114/FIG. 8—PA,P3) provide external voltage sensing and charging of the new batteries (FIG. 4—115,116 ) used in the battery pack. These may desirable by NiMH AAA size batteries. Installation of the replacement battery pack requires the existing batteries to be removed and the replacement battery pack to be installed in their place (see FIG. 5). The exposure of the battery packs electrical connections (FIG. 1—113,114/FIG. 8—P4,P3) is provided via a replacement battery compartment door (FIG. 1—102) containing two holes ( FIG. 1—111,112) through which access to the electrical contacts (FIG. 1—113,114/FIG. 8—P4,P3) is made. The battery pack contacts (FIG. 1—113,114/FIG. 8—P4,P3 ) have electrical connections to the positive and negative terminals of the combined NiMH batteries ( see FIG. 8) for voltage sensing and recharging. Short circuit protection is provided by a current limiting resistor ( FIG. 8-R9) and charge current shunts through a diode (FIG. 8—D4). The matching impedance of the sensing input to the microprocessor (FIG. 9—U1) requires less then 10k ohms of resistance for accurate analog-to-digital (A/D) conversions (as per manufacturers specifications) therefore 4.7k ohms was chosen for both FIG. 8—R9/FIG. 8—Rl5. Less then 1mA of current drain would occur through FIG. 8—R9 if the exposed battery pack contacts (FIG. 1—113,114/FIG. 8—P4,P3) were shorted so negligible levels of heat would be generated and the time it would take to deplete a fully charge battery pack due to the shorting of the exposed battery pack contacts (FIG. 1—113,114) would be in the hundreds of hours. Values between 4.7k ohm and 2.7k ohm would be acceptable in limiting the drainage current and still provide the required impedance for FIG. 9—U1. The charging circuit (FIG. 1—105), and its mating electrical contacts (FIG. 1—108, 109/FIG. 9—P1,P2) for connecting to the exposed battery contacts (FIG. 1—113,114/FIG. 8—P4,P3), resides in the adapter housing (FIG. 1—100) which is attached to the data cradle (FIG. 1—103). The electrical contacts in the adapter housing (108,109/FIG. 9—Pl,P2 ) are extend to the proper position relative to the PDA's battery door (FIG. 5—102) and make electrical contact with the replacement battery packs exposed electrical contacts (FIG. 5—113,114/FIG. 8—P4,P3) and allow the PDA (FIG. 5—110) to rest on the adapter housing surface (FIG. 1—107). The adapter housing's thin design enables the PDA (FIG. 2A—110) to rest on the housing (FIG. 1—100) without interfering with the PDA's connection to the data cradle data port (FIG. 1—117). To avoid interference, the housing design incorporates a thin wedge shaped portion (see FIG. 7B Cross Sectional View) that is positioned between the PDA (FIG. 6—110) and the data cradle's PDA interfacing surface. The adapter housing's wedge shaped portion incorporates a resting surface for the PDA (FIG. 7A—107). The adapter housing resting surface (FIG. 1—107) positions and stabilizes the PDA during use while the PDA is mounted in the augmented data cradle (see FIG. 6). The stabilized position of the PDA allows for consistent electrical contact with both the data cradle's data port (FIG. 1—117) and the battery contacts (FIG. 5—113,114/FIG. 8—P4,P3). The housing design locates the charging circuit (FIG. 1—105) and the electrical contacts (FIG. 1—108,109/FIG. 9—P1,P2) connected to the charging circuit, in the adapter housing (FIG. 1—100) to minimize the thickness of that portion of the adapter housing that is between the PDA (FIG. 2A—110) and its data cradle (FIG. 1—103). The thickness and length of the adapter housing (approximately 0.6" at the low end, 0.16", at the top of the cradle, and 1.4" long) is necessary to avoid interference of the adapter and ensure a good electrical connection is maintained between the PDA (FIG. 2A—110) and the data cradle's data port (FIG. 1—117).

The charging circuits electrical contacts (FIG. 1—108, 109/FIG. 9—P1,P2 ) are designed of 0.010" thick material and have a 1.675" length which allows the battery contacts (FIG. 1—113,114/FIG. 8—P4,P3) to make an electrical connection to the charging circuit (FIG. 1—105) without interfering with the PDA's connection to the data cradle's data port (FIG. 1—117). This allows the PDA (FIG. 2A—110) with this embodiment's battery pack (FIG. 1—101 ), to have a connection with the data port (FIG. 1—117) and at the same time have a connection to the charging circuit (FIG. 1—105).

Figure 9:
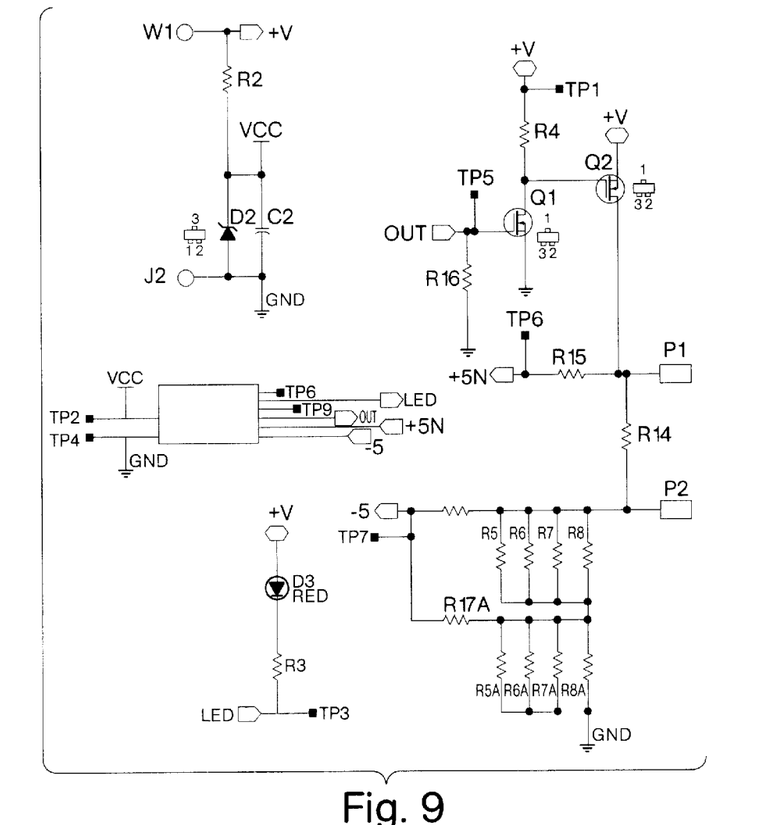
FIG. 9 illustrates SCH. 2, an electrical schematic of a charging circuit in accordance with the preferred embodiment of the present invention.
Figure 10:
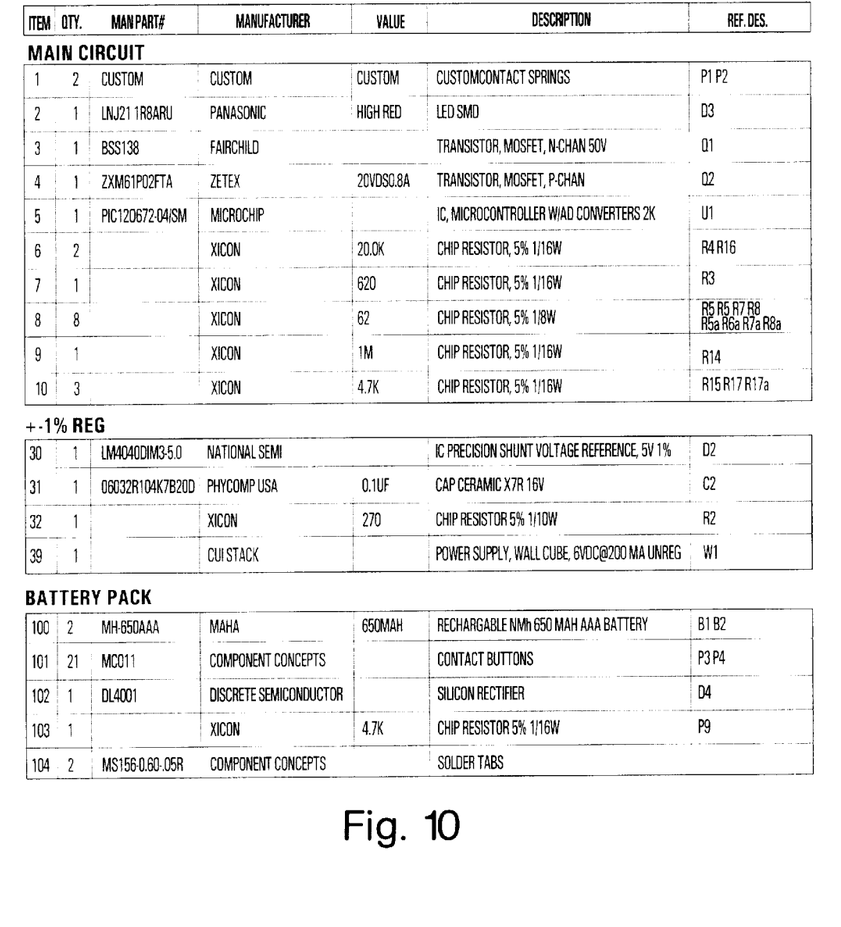
FIG. 10 illustrates BOM. 1, a bill of materials for a battery charger cradle adapter's electrical system in accordance with the preferred embodiment of the present invention.

Referring to schematic 2 (FIG. 9) the charging circuit comprises a microprocessor (FIG. 9—U1) which is used to read the voltage of the replacement battery pack (FIG. 1—101) and turn on a charge current, via a FET transistor pair (FIG. 9—Q1,Q2), for the proper duration based on the batteries (FIG. 10—B1,B2) electrical characteristics such as those of the NiMh type, and the AAA size. The microprocessor (FIG. 9—U1) uses built-in analogto-digital (A/D) converters to acquire the voltages used to determine the charge state and current. The charging circuit receives its electrical power from a power supply (FIG. 10—W1). The typical external power source for this embodiment is the power supply (FIG. 10—W1) connected to a 110 volt 60 Hz alternating current (AC) source found in U.S. residences and offices. Other power sources could include, but are not limited to, the 12 volts direct current (DC) found in automobiles and power sources found in airplanes as long as they provide the characteristics of the designed part ( FIG. 10—W1) to the charging circuit. The charge current is adjusted based on microprocessor calculations made using values of circuit components (FIG. 9—R14,R15,R17/R17A) and the voltage read from internal sense resistors (FIG. 9—R5/5A—R8/8A). The user interface Input/Output augmentation of the data cradle is extended by the adapter (FIG. 1—100) and implemented as a charging state indicator (FIG. 1—104). The indicator light (FIG. 1—104) is viewable from the front left side of the augmented data cradle while the PDA (FIG. 2—110) is mounted. This adapter has facilities for optional/additional right side viewing (FIG. 6—104). The adapter has the same indicator details (FIG. 6—104) on the right side of the adapter should another user input/output function be incorporated into the electrical circuit.

Conclusion

The foregoing Detailed Description has disclosed to those skilled in the relevant technical disciplines how to make and use a battery charger adapter for the data cradle of a hand-held PDA and has further disclosed the best mode presently known to the inventor for making such an adapter. As set forth above, the battery charger adapter is an exemplary embodiment of a general set of techniques which may be used to extend the use of a data cradle for a hand-held PDA. The particular form of any such data cradle battery charger adapter will necessarily depend upon the forms of the data cradle and hand-held PDA with which the adapter will be used and particularly on the location of the hand-held PDA's batteries and the manner in which they are made accessible to the adapter and upon the materials used to construct the adapter. Similarly, the particular form of any other kind of adapter which employs the techniques disclosed herein for extending the utility of a data cradle will depend on the form of the cradle and the PDA and will also depend on the manner in which the utility of the cradle is to be extended.

For all of the foregoing reasons, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

What is claimed is:

1. An adapter that adds a function to a cradle for a hand-held device, the adapter comprising:

an adapter surface that is attachable to the cradle, the adapter surface being located between a surface of the cradle and a surface of the hand-held device when the adapter surface is attached to the cradle and the hand-held device is in the cradle and the surface of the hand-held device having a first interface for the function; and a second interface for the function that is located in the adapter surface such that when the adapter surface is attached to the cradle and the hand-held device is in the cradle, the second interface interacts with the first interface as required for the function.

2. A kit that makes it possible to recharge a battery-powered hand-held device that has a cradle by placing the hand-held device in its cradle, the hand held device's batteries being contained in a compartment that opens onto a surface of the hand-held device and the kit comprising:

an adapter surface that is attachable to the cradle, the adapter surface being located between a surface of the cradle and the surface of the hand-held device when the adapter surface is attached to the cradle and the hand-held device is in the cradle, the adapter surface having a first interface for providing a recharging current to the hand-held device; and a battery holder that is capable of replacing the batteries in the compartment, the battery holder including a second interface for receiving the recharging current, the second interface being coupled to the first interface when the batteries have been replaced by the battery holder, the adapter surface has been attached to the cradle, and the hand-held device is in the cradle.

* * * * *